(12) United States Patent
Riva et al.

(10) Patent No.: US 11,655,380 B2
(45) Date of Patent: May 23, 2023

(54) MULTILAYERED FLEXIBLE PACKAGE WITH ANTIOXIDANT PROPERTIES

(71) Applicant: SAES GETTERS S.P.A., Lainate (IT)

(72) Inventors: Miriam Riva, Lomazzo (IT); Paolo Vacca, Milan (IT); Katarzyna Fidecka, Cantù (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 17/789,608

(22) PCT Filed: Jul. 29, 2021

(86) PCT No.: PCT/EP2021/071347
§ 371 (c)(1),
(2) Date: Jun. 28, 2022

(87) PCT Pub. No.: WO2022/023503
PCT Pub. Date: Feb. 3, 2022

(65) Prior Publication Data
US 2023/0044099 A1 Feb. 9, 2023

(30) Foreign Application Priority Data

Jul. 30, 2020 (IT) ........................ 102020000018589

(51) Int. Cl.
*C08J 3/215* (2006.01)
*C08L 5/04* (2006.01)
(Continued)

(52) U.S. Cl.
CPC ............... *C09D 7/40* (2018.01); *B32B 27/08* (2013.01); *B32B 27/283* (2013.01); *B32B 27/302* (2013.01); *B32B 27/308* (2013.01); *B32B 27/32* (2013.01); *B32B 27/36* (2013.01); *B65D 65/42* (2013.01); *C08J 7/0427* (2020.01); *B32B 2250/02* (2013.01); *B32B 2250/24* (2013.01); *B32B 2255/10* (2013.01); *B32B 2255/26* (2013.01); *B32B 2307/516* (2013.01); *B32B 2439/46* (2013.01); *B32B 2439/70* (2013.01); *B32B 2439/80* (2013.01);
(Continued)

(58) Field of Classification Search
None
See application file for complete search history.

(56) References Cited

U.S. PATENT DOCUMENTS 10,723,536 B2   7/2020   Withers

FOREIGN PATENT DOCUMENTS

| GB | 2237574 A | 5/1991 |
|----|-----------|--------|
| RO | 131883 B1 | 9/2019 |
| WO | WO-2014170426 A1 | 10/2014 |

OTHER PUBLICATIONS

Fuat Topuz et al, "Antioxidant, antibacterial and antifungal electrospun nanofibers for food packaging applications", Food Research International, vol. 130, 2020, XP086080883, pp. 1-27.
(Continued)

*Primary Examiner* — Ellen S Hock
(74) *Attorney, Agent, or Firm* — Element IP, PLC

(57) ABSTRACT

A multilayered flexible package comprises a polymeric coating (2) that contains a dispersion of antioxidant capsules (3) having a particle size distribution comprised between 0.1 and 10 μm and a core-shell structure comprising a core (4), of an antioxidant with a reduction potential comprised between 0.1 and 0.5 V, and a polymeric shell (5) covering the core (4) at least by 70%.

17 Claims, 3 Drawing Sheets

(51) Int. Cl.

| | |
|---|---|
| *C09D 7/40* | (2018.01) |
| *B32B 27/08* | (2006.01) |
| *B32B 27/32* | (2006.01) |
| *B32B 27/30* | (2006.01) |
| *B32B 27/28* | (2006.01) |
| *B65D 65/42* | (2006.01) |
| *C08J 7/04* | (2020.01) |
| *B32B 27/36* | (2006.01) |
| *C08K 3/105* | (2018.01) |
| *C08K 5/00* | (2006.01) |
| *C08K 9/10* | (2006.01) |

(52) U.S. Cl.
CPC ........ *C08J 2367/02* (2013.01); *C08J 2471/02* (2013.01); *C08K 3/105* (2018.01); *C08K 5/005* (2013.01); *C08K 9/10* (2013.01)

(56) References Cited

OTHER PUBLICATIONS

International Search Report and Written Opinion dated Nov. 8, 2021 in PCT/EP2021/071347, 16 pages.
Raluca P. Dumitriu et al, "Functionalized Coatings by Electrospinning for Anti-oxidant Food Packaging", Procedia Manufacturing, vol. 12, 2017, XP002802359, pp. 59-65.
Search Report and Written Opinion dated Mar. 26, 2021 in Italian Patent Application No. 202000018589, 9 pages.

MULTILAYERED FLEXIBLE PACKAGE WITH ANTIOXIDANT PROPERTIES

The present invention relates to a multilayered flexible package characterized by antioxidant properties obtained through a core-shell system dispersion.

In the field of packaging and storage of air-sensitive materials, one of the most important goals to be reached is to avoid the loss of materials properties due to oxidation-related degradation. For instance, the oxidation process is considered the major cause of deterioration for perishable goods and foods affecting their quality and safety, and in particular the nutritional and sensory quality of foods.

One of the possible solutions to this problem relies on the use of antioxidant species able to inhibit the oxidation reactions and the subsequent production of free radicals.

In this field, the integration of said antioxidants into active packaging is one of the most promising alternatives for the control of oxidation-related degradation processes.

A largely used approach is represented by the addition of the antioxidant species during the polymerization process as reported, for example, in WO 2014/170426 which describes the integration of antioxidant molecules, specifically catechines, in a polyurethane matrix through their addition to one of the components of the polyurethane adhesive, prior to the polymerization reaction or after mixing the two reagents of the composition.

Also US 2006/0047069 applies a similar strategy with the addition of the antioxidant in a polymeric dispersion during the polymerization process, setting a specific pH range.

Another possible approach is reported in WO 2017/049364 which discloses a food packaging material comprising a polymeric material and a natural antioxidant. The described method to obtain the packaging material involves the addition of the natural antioxidant as a solid, a liquid, an oil, a powder or as an emulsion into the polymeric material, and a following process of extrusion (including cast film extrusion and blow film extrusion), moulding, or lamination to form the food packaging material.

Still another approach for adding antioxidants to a polymeric material is disclosed in GB 2237574 which teaches the preparation of capsules by spraying an emulsion of the antioxidant and aqueous sodium alginate into a cross-linking bath containing an aqueous solution of a di- or multi-valent metal salt. Instantaneous reaction between the emulsion and the metal causes the alginate to cross-link and form a "sponge"-like matrix containing the antioxidant in its interstices. In the text, the matrix particles are referred to as capsules and the process is referred to as encapsulation, but this terminology should not be interpreted as including "balloon"-type capsules having distinct boundary walls; rather, the capsules described in GB 2237574 resemble "sponges" having irregular surfaces and possessing a multiplicity of pores.

However, the described methods present some critical points for the final use in a packaging system such as the final thickness of the layer which can be reached, essentially not lower than 100-200 µm, with a consequent reduction of the possible applications of the final solution. A further limitation is represented by the placement of the antioxidant species into the layer of the package, with a consequent reduction of the antioxidant activity due to its distance from the outer portion of the container. Moreover, the integration of some specific molecules such as catechines, and their distribution, is strictly related to the chemical compatibility with the characteristics of polymer employed.

A further drawback is related to the application, for example during the extrusion process, of elevated temperatures that can lead to the antioxidant molecules spoilage. Indeed, it is important to point out that the use of antioxidants in this field is limited by their own nature, specifically by their instability under the exposure to oxygen, light, high temperatures, pH and storage time.

The object of the present invention is to manufacture a multilayered flexible package that overcomes the above-mentioned drawbacks. This object is achieved by a multilayered flexible package comprising at least one polymeric coating that contains a dispersion of antioxidant capsules having a particle distribution comprised between 0.1 and 10 µm and a core-shell structure comprising a core of an antioxidant, with a reduction potential comprised between 0.1 and 0.5 V, and a polymeric shell covering the core at least by 70%.

The structure and characteristics of the package according to the present invention will be clear to those skilled in the art from the following detailed description of some embodiments thereof, with reference to the annexed drawings wherein.

Figure 1:
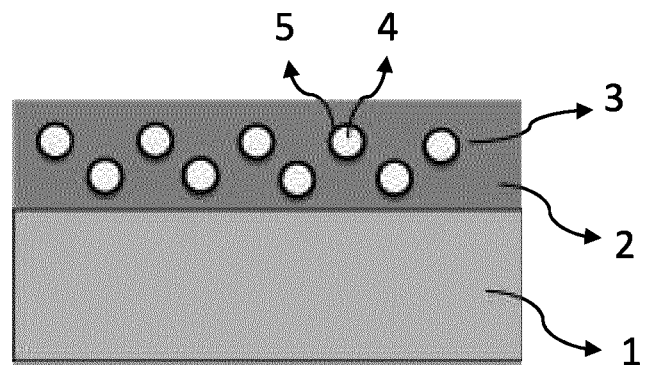
FIG. 1 is a schematic sectional view of a film to be used for a first embodiment of the present invention.

For the purpose of the present invention the above particle distribution range shall mean that 90% of the capsules dispersed have a mean volume diameter comprised in the claimed range when measured by laser diffraction technique. The definitions and the considerations about laser diffraction theory and practice are derived from the standard ISO 13320:2020. The reduction potential of antioxidant species has been found to be in relation to the ease of compounds to donate hydrogen to free radicals, and the lower the reduction potential is the greater the hydrogen-donating ability of the antioxidant will be. Thus, the antioxidant species with a reduction potential comprised between 0.1 and 0.5 V have proven to be the most effective in carrying out their antioxidant effect avoiding the degradation of the air-sensitive materials contained in the package.

In particular, the antioxidant species employed in the disclosed invention are selected in a group consisting of tannic acid, propyl gallate, gallic acid, caffeic acid, ascorbic acid and ferulic acid.

Particles size has been found to be a key parameter in decreasing the reduction potential of antioxidant materials, with a significant effect moving down from 100 µm to 10 µm in particles size. Moreover, particles size and shape are key characteristics in enabling antioxidant materials integration in packaging configurations. In particular, packaging systems for food, cosmetic, nutraceutical and pharmaceutical products typically consist of layers with thickness ranging from 0.5 to 100 µm where a fine distribution of functional fillers, e.g. antioxidant particles, can be ensured from particles with size comprised between 0.1 and 10 µm and spherical shape.

The preparation of antioxidant particles with 0.1-10 µm size according to the present invention is not made through the mechanical processes typically used for the preparation of powders (with the consequent impossibility to obtain powders with a particle size lower than 100 μm) but including an intermediate step through material solubilization and a subsequent precipitation in wet or dry processes. Such processes can be solvent evaporation, sol-gel processes, microemulsions, layer-by-layer adsorption technique, macroemulsification, membrane-assisted emulsification, membrane-assisted nanoprecipitation, in-situ polymerization, coacervation/phase separation, interfacial polymerization, prilling, spray drying, freeze drying, ionic gelation or fluidized bed technology.

The capsule system is completed by the presence of a polymeric shell covering the antioxidant core, the polymer being added in an amount such that the ratio between the weight of the shell and the weight of the entire core-shell system is comprised between 0.25 and 0.75. In this way, each capsule 3 has a core-shell structure comprising a core 4, of an antioxidant with a reduction potential comprised between 0.1 and 0.5 V, and a polymeric shell 5 covering core 4.

The polymeric shell 5, in a first embodiment according to the present invention, can be selected among carbohydrates, gums, lipids, proteins, natural polymers, fossil origin polymers and their copolymers, and in a preferred configuration the natural polymers are alginates and the fossil origin polymers and their copolymers are polyethylene-co-(vinyl alcohol) (EVOH).

Moreover, said polymeric shell 5 covers at least 70% of core 4 and in a preferred embodiment it completely covers core 4.

In an alternative embodiment, the polymeric shell 5 can be glutaraldehyde, diphenylphosphoryl azide (DPPA), genipin or enzymes, such as transglutaminase, tyrosinase and laccase.

The above-disclosed capsules 3 are then dispersed in a polymeric coating 2 in an amount comprised between 5 and 50% by weight with respect to the polymeric coating 2.

Said polymeric coating 2 is characterized by a thickness comprised between 0.5 and 100 μm and can be selected among acrylics, acrylics-styrene, -vinyl and alkyd copolymer, urethane-acrylics, aliphatic-urethanes, urethanes, polyesters, biopolyesters, epoxies, siloxanes and polysiloxanes, polyurethanes, polystyrene, phenolic resin, poly(ethylene-co-vinyl alcohol) (EVOH), poly(vinyl alcohol) (PVAL), poly(lactic-co-glycolic acid) (PLGA), polyethylene glycol (PEG), polyethylene (PE), polystyrene (PS) and their copolymers, poly(vinyl acetate) (PVAC), waterborne and water reducible latex.

In this context, as disclosed in the present invention, the use of an antioxidant system based on core-shell technology (capsules) is enough to prevent the antioxidants degradation, improve the protection and the integration of the active materials in the final configuration and increase the control of their functional activity, without the need of further protective elements.

Additionally, a further relevant feature to be considered in the integration of antioxidants into an active package is related to the dispersion of said materials into the organic matrix. More specifically, the use of core-shell structures, unlike the powder systems largely reported in the prior art, increases the control and the homogeneity of the dispersion with a consequent performance improvement.

Therefore, considering the whole system complexity, the core-shell capsules of the present invention can be prepared through different processes, as described above, which avoid the antioxidant degradation and, at the same time, allow a homogeneous and regular distribution of said capsules in the polymeric matrix.

In order to enhance some specific features of the package, a filler material can be further added to the polymeric coating 2 in an amount comprised between 1 and 30% by weight with respect to the polymeric coating 2. Said filler can be selected among zeolites, hydrotalcites, zirconium phosphate, porphyrins, graphene and other two-dimensional crystals, graphene oxide, metal organic frameworks (MOFs), cellulose and capsules of ethylene-vinyl alcohol copolymer.

For instance, if a moisture barrier effect has to be achieved, the filler can be a zeolite selected among Faujasite (FAU), mordenite (MOR), ZSM-5 and Linde Type A. Additionally, in a further embodiment it is possible to have an oxygen barrier effect with the addition of a dispersion of a first ethylene-vinyl alcohol copolymer in the form of particles with an ethylene content comprised between 24 and 38 mol % (high ethylene content) and a second ethylene-vinyl alcohol copolymer with an ethylene content lower than 15 mol % (low ethylene content) as reported for the capsules disclosed in WO 2020/012396 in the applicant's name.

In a preferred embodiment the polymeric coating 2 is applied as a continuous frame along the perimeter of the package or as a continuous layer covering the entire surface of the package.

As shown in FIG. 1, the polymeric coating 2 including the core-shell capsules 3 can be used coupled to several kinds of substrate 1, as for example polypropylene (PP), oriented polypropylene (OPP), biaxially-oriented polypropylene (BOPP), polyethylene (PE) and low density polyethylene (LDPE), polyamide (PA) and biaxially-oriented polyamide (BOPA), polyethylene terephthalate (PET) and biaxially-oriented polyethylene terephthalate (BOPET), polyethylene furanoate (PEF), polybutylene adipate terephthalate (PBAT), polybutylene succinate (PBS), polylactic acid (PLA), biaxially-oriented polylactic acid (PLA), mater-bi (biodegradable plastics based on corn starch), polyhydroxyalkanoates (PHA), starch blends, paper and laminated paper, lignin cellulose blend and cellophane.

Figure 2:
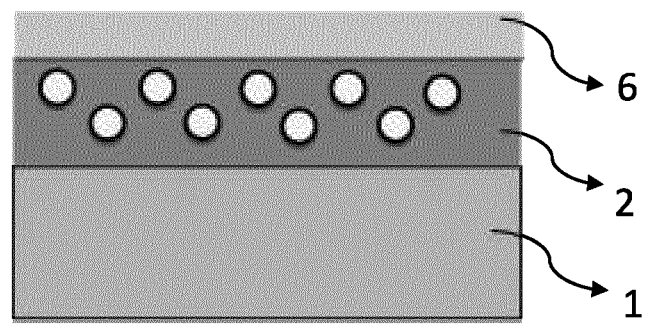
FIG. 2 is a view similar to FIG. 1 of a film to be used for a second embodiment of the present invention.

Moreover, said polymeric coating 2 can be covered, as represented in FIG. 2, with a polymer layer 6 selected among polyethylene (PE), machine-directed oriented polyethene (MDO-PE), low density polyethylene (LDPE), acrylics, acrylics-styrene, acrylics copolymers, siloxanes and polysiloxanes.

Finally, considering the broad interest in preserving different air-sensitive materials the herein described solution can be easily employed in packaging systems for food, cosmetic, nutraceutical or pharmaceutical products.

EXAMPLES

Hereinafter, the invention will be explained in more detail with reference to the following examples.

Preparation of Sample S1 According to the Present Invention

The core-shell capsules 3 are prepared by adding chitosan, as precursor of the polymeric shell 5, at 1% by weight with respect to a 0.1 M solution of HCl kept under stirring at 200 rpm at RT. After solubilization, tannic acid, as antioxidant material, is added at 2% by weight with respect to the chitosan solution and kept under stirring in the same conditions. After its solubilization, the resulting formulation is spray-dried obtaining core-shell capsules 3 presented in the form of monodispersed capsules with a size (diameter) less than 10 μm for at least 90% of the particles.

Preparation of Comparative Sample C1

The antioxidant particles, without shell, are prepared by adding tannic acid at 4% by weight with respect to a water solution kept under stirring at 200 rpm at RT. After its solubilization, the resulting formulation is spray-dried obtaining particles presented in the form of monodispersed particles with a size (diameter) less than 10 μm for at least 90% of the particles The following table 1 reports the spray-drying parameters adopted during sample preparations:

TABLE 1

| Spray-drying parameters adopted | | | |
|---|---|---|---|
| Sample | $T_{inlet}$ (° C.) | % pump | % Aspirations |
| S1 | 150 | 30 | 90 |
| C1 | 150 | 30 | 95 |

Description of Comparative Sample C2

Tannic acid purchased from Sigma Aldrich is selected as comparative sample without submitting it to a transformation process into particles. Sample C2 is presented in the form of a powder with a size (diameter) less than 100 μm for at least 90% of the particles.

Coating Preparations

In according to the present invention, the above-disclosed samples S1, C1 and C2 are then dispersed in two different polymer matrices, in order to obtain a low-thickness coating.

A) Samples S1, C1 and C2 are dispersed in an amount of 10% by weight with respect to the polymeric coating in a polyethylene glycol dimethacrylate solvent-less polymeric resin, with a 1% hydroxyketone-based system as photoinitiator. For the preparation of the polymeric coating characterized by low thickness values, the obtained dispersion is bladed adopting a spiral bar with 4 μm of nominal thickness, on PET, and the obtained coating is submitted to a UV curing process (15 sec, 100 mW/cm$^2$). The sample S1 is characterized by a more regular and homogeneous distribution of capsules into the polymeric layer than sample C2 for which, due to its size, it is not possible to guarantee a regular dispersion of antioxidant material into the low thickness polymeric layer. Comparing sample S1 with C1, the presence of the polymeric shell preserves the antioxidant reactivity into the polymeric binder, ensuring its homogeneous dispersion and functionality.

B) Samples S1, C1 and C2 are dispersed in a polysiloxanes solvent-less polymeric resin in an amount of 10% by weight with respect to the polymeric coating. For the preparation of the polymeric coating characterized by low thickness values, the obtained dispersion is bladed adopting a spiral bar with 4 μm of nominal thickness, on PET, and the obtained coating is submitted to a thermal curing process at 80° C. for 45 minutes. The sample S1 is characterized by a more regular and homogeneous distribution of capsules into the polymeric layer than sample C2 for which, due to its size, it is not possible to guarantee a regular dispersion of antioxidant material into the low thickness polymeric layer. Comparing sample S1 with C1, the presence of the polymeric shell preserves the antioxidant reactivity toward reactive species, as explained in the following paragraph.

Particles Functionality by Microcalorimetric Technique:

The antioxidant capacity of samples S1, C1 and C2 is tested by microcalorimetric technique in order to monitor the inhibition of an oxidation reaction comparing linseed oil (LO) alone, as standard reference, and LO mixed with samples S1, C1 and C2. In isothermal mode, the oil in the thermostat was maintained at a temperature of 30° C. and the heat generated was continuously measured over time.

Figure 3A:
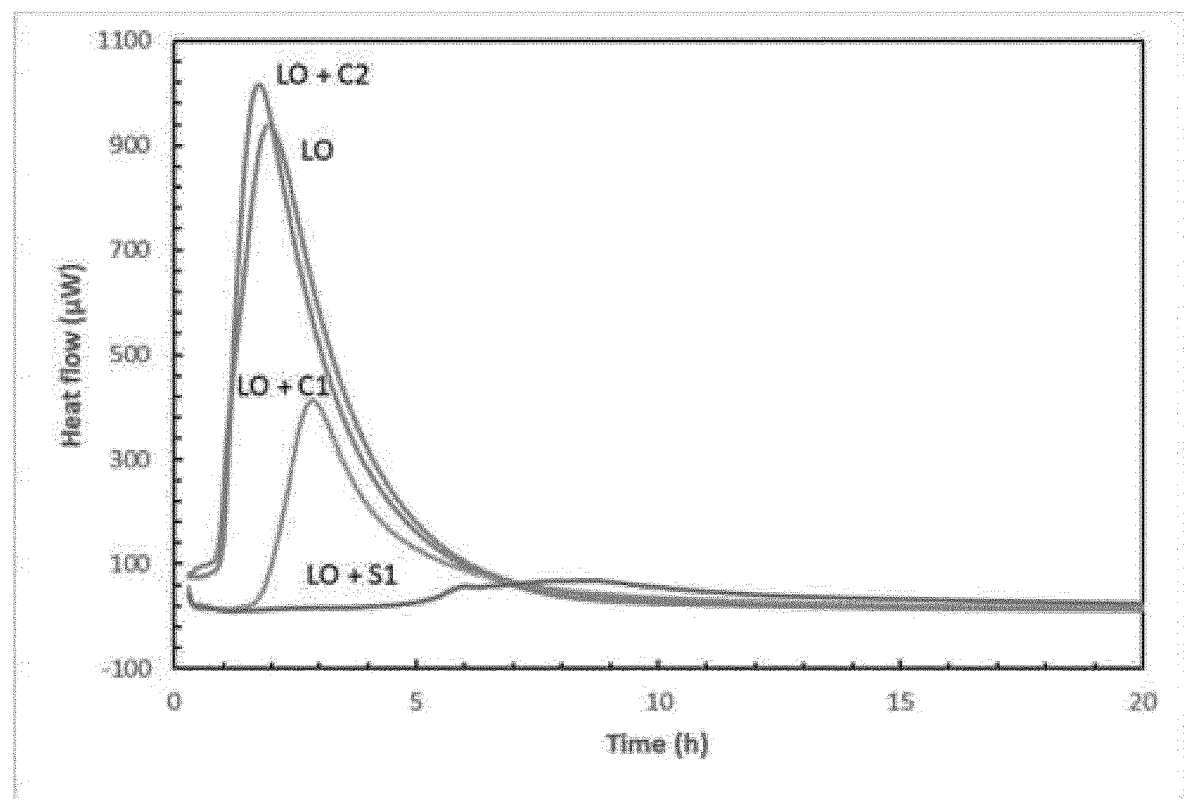
FIG. 3A is a graph comparing the delay of oxidation provided by an embodiment of capsules according to the invention with respect to other three solutions outside the invention.

The graph of FIG. 3A shows the comparison of the delay, in term of oxidation, of standard linseed oil (LO) thanks to the activity of samples S1, C1 and C2. As evident, sample S1 guarantees much longer preservation time, in term of oxidation, of linseed oil in comparison to the particles of sample C1 and the powder of sample C2. In particular, for sample C2, in the form of a powder with a size (diameter) less than 100 μm, no relevant antioxidant capacity was observed in the testing conditions.

Coating Functionality by Microcalorimetric Technique:

The antioxidant capacity of a coating comprising samples S1 and C1 is tested by microcalorimetric technique in order to monitor the inhibition of an oxidation reaction comparing linseed oil (LO) alone, as standard reference, and LO mixed with a coating comprising samples S1 and C1. In isothermal mode, the oil in the thermostat was maintained at a temperature of 30° C. and the heat generated was continuously measured over time.

Figure 3B:
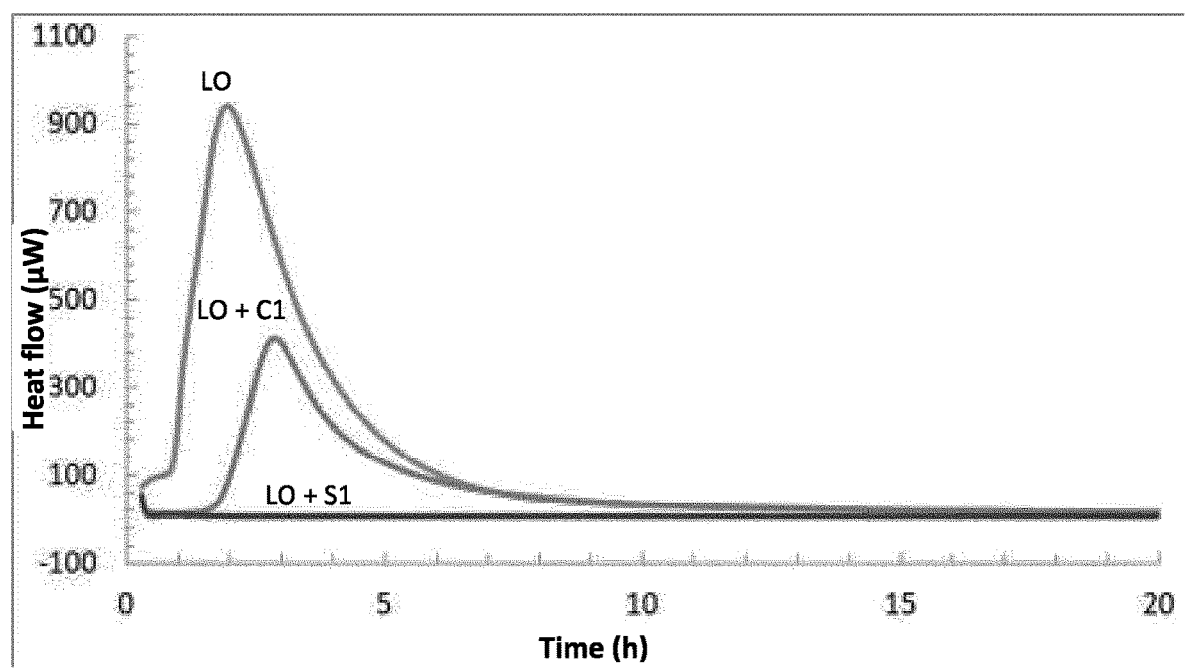
FIG. 3B is a graph comparing the delay of oxidation provided by an embodiment of the invention with respect to other two solutions outside the invention.

The graph of FIG. 3B shows the comparison of the delay, in term of oxidation, of standard linseed oil (LO) thanks to the activity of samples S1 and C1. The respective coatings are prepared following procedure A, i.e. by dispersing said samples in a polyethylene glycol dimethacrylate solvent-less polymeric resin.

It is therefore evident that the coating comprising sample S1 guarantees a preservation over 20 hours, in term of oxidation, of linseed oil, whereas with the use of the coating comprising sample C1, due to the absence of the protective shell, the antioxidant particles react immediately, with a consequent reduction of the time of preservation.

The invention claimed is:

1. A multilayered flexible package, comprising at least one polymeric coating that comprises a dispersion of antioxidant particles, wherein said antioxidant particles are contained in capsules having a volume mean diameter comprised between 0.1 and 10 μm and a core-shell structure comprising:
   a core of an antioxidant with a reduction potential comprised between 0.1 and 0.5 V; and
   a polymeric shell covering at least 70% of said core.

2. The package according to claim 1, wherein the antioxidant is selected from the group consisting of tannic acid, propyl gallate, gallic acid, caffeic acid, ascorbic acid, and ferulic acid.

3. The package according to claim 1, wherein the polymeric shell is selected from the group consisting of carbohydrates, gums, lipids, proteins, natural polymers, fossil origin polymers and their copolymers.

4. The package according to claim 3, wherein the natural polymers are alginates and the fossil origin polymers and their copolymers are polyethylene-co-(vinyl alcohol) (EVOH).

5. The package according to claim 1, wherein the polymeric shell comprises, in reacted form, at least one selected from the group consisting of glutaraldehyde, diphenylphosphoryl azide (DPPA), genipin, and an enzyme selected from the group consisting of transglutaminase, tyrosinase, and laccase.

6. The package according to claim 1, wherein the polymeric coating is selected from the group consisting of acrylics, acrylics-styrene, -vinyl and alkyd copolymer, urethane-acrylics, aliphatic-urethanes, urethanes, polyesters, biopolyesters, epoxies, siloxanes, polysiloxanes, polyurethanes, polystyrene, phenolic resin, polyethylene-co-(vinyl alcohol) (EVOH), poly(vinyl alcohol) (PVAL), poly(lactic-co-glycolic acid) (PLGA), polyethylene glycol (PEG), polyethylene (PE), polystyrene (PS) and their copolymers, poly(vinyl acetate) (PVAC), waterborne and water reducible latex.

7. The package according to claim 1, wherein the polymeric coating has a thickness comprised between 0.5 and 100 μm.

8. The package according to claim 1, wherein the antioxidant capsules are added in an amount comprised between 5 and 50% by weight with respect to the polymeric coating.

9. The package according to claim 1, wherein a ratio between the weight of the shell and the weight of the entire core-shell system is comprised between 0.25 and 0.75.

10. The package according to claim 1, wherein the polymeric coating further comprises a filler in an amount comprised between 1 and 30% by weight with respect to the polymeric coating.

11. The package according to claim 10, wherein the filler is selected from the group consisting of zeolites, hydrotalcites, zirconium phosphate, porphyrins, graphene and other two-dimensional crystals, graphene oxide, metal organic frameworks (MOFs), cellulose, and capsules of ethylene-vinyl alcohol copolymer.

12. The package according to claim 11, wherein the zeolites are selected in a group consisting of Faujasite (FAU), mordenite (MOR), ZSM-5, and Linde Type A.

13. The package according to claim 1, wherein the polymeric coating is applied as a frame or a continuous layer.

14. The package according to claim 1, wherein the polymeric coating is coupled to a substrate selected in the group consisting of polypropylene (PP), oriented polypropylene (OPP), biaxially-oriented polypropylene (BOPP), polyethylene (PE), low density polyethylene (LDPE), polyamide (PA), biaxially-oriented polyamide (BOPA), polyethylene terephthalate (PET), biaxially-oriented polyethylene terephthalate (BOPET), polyethylene furanoate (PEF), polybutylene adipate terephtalate (PBAT), polybutylene succinate (PBS), polyactic acid (PLA), bio-oriented polyactic acid (PLA), mater-bi, polyhydroxyalkanoates (PHA), starch blends, paper, laminated paper, lignin cellulose blend, and cellophane.

15. The package according to claim 1, wherein the polymeric coating is covered with a polymer layer selected from the group consisting of polyethylene (PE), machine-directed oriented polyethene (MDO-PE), low density polyethylene (LDPE), acrylics, acrylics-styrene, acrylics copolymers, siloxanes, and polysiloxanes.

16. The package according to claim 1, wherein the polymeric shell covers 100% of said core.

17. The package according to claim 1, wherein the polymeric shell covers 100% of said core.

* * * * *